(12) United States Patent
Fattal

(10) Patent No.: US 11,402,689 B2
(45) Date of Patent: Aug. 2, 2022

(54) MIXED-FORMAT BACKLIGHT, DISPLAY, AND METHOD

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/134,390

(22) Filed: Dec. 26, 2020

(65) Prior Publication Data

US 2021/0116757 A1    Apr. 22, 2021

Related U.S. Application Data

(63) Continuation of application No. PCT/US2018/040437, filed on Jun. 29, 2018.

(51) Int. Cl.
*G02F 1/13357*    (2006.01)
*G02F 1/1677*    (2019.01)

(52) U.S. Cl.
CPC ...... *G02F 1/133606* (2013.01); *G02F 1/1677* (2019.01)

(58) Field of Classification Search
None
See application file for complete search history.

(56) References Cited

U.S. PATENT DOCUMENTS

| | | | |
|---|---|---|---|
| 8,614,771 B2 | 12/2013 | Hong et al. | |
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 10,649,128 B2 | 5/2020 | Fattal et al. | |
| 10,705,281 B2 | 7/2020 | Fattal et al. | |
| 10,788,619 B2 | 9/2020 | Fattal | |
| 10,810,917 B2 | 10/2020 | Fattal | |
| 2011/0227895 A1 | 9/2011 | Takahashi et al. | |
| 2017/0329149 A1 | 11/2017 | Fattal | |
| 2017/0363878 A1 | 12/2017 | Pijlman et al. | |
| 2019/0155105 A1 | 5/2019 | Aieta et al. | |

(Continued)

FOREIGN PATENT DOCUMENTS

| JP | 2018085267 A | 5/2018 |
|---|---|---|
| KR | 20080000425 A | 1/2008 |

(Continued)

OTHER PUBLICATIONS

International Search Report and Written Opinion (ISRWO) by International Searching Authority (ISA) Korean Intellectual Property Office (KIPO) dated Mar. 8, 2019 (12 pages) for counterpart parent PCT Application No. PCT/US2018/040437.

(Continued)

*Primary Examiner* — Britt D Hanley
(74) *Attorney, Agent, or Firm* — J. Michael Johnson

(57) ABSTRACT

A mixed-format backlight and display employ a multiview zone to provide directional emitted light corresponding to a multiview portion of a mixed-format displayed image and a two-dimensional (2D) zone to provide broad-angle emitted light corresponding to a 2D portion of the mixed-format displayed image. A size of a multibeam emitter of the multiview zone is comparable to a size of a light valve of the mixed-format display.

19 Claims, 5 Drawing Sheets

(56) References Cited

U.S. PATENT DOCUMENTS

2020/0117053 A1    4/2020   Fattal et al.
2020/0301165 A1    9/2020   Fattal

FOREIGN PATENT DOCUMENTS

KR    20160111593 A    9/2016
WO    2012038856 A1    3/2012

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

MIXED-FORMAT BACKLIGHT, DISPLAY, AND METHOD

CROSS-REFERENCE TO RELATED APPLICATIONS

This application is a continuation application of and claims the benefit of priority to prior International Application No. PCT/US2018/040437, filed Jun. 29, 2018, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as active displays. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
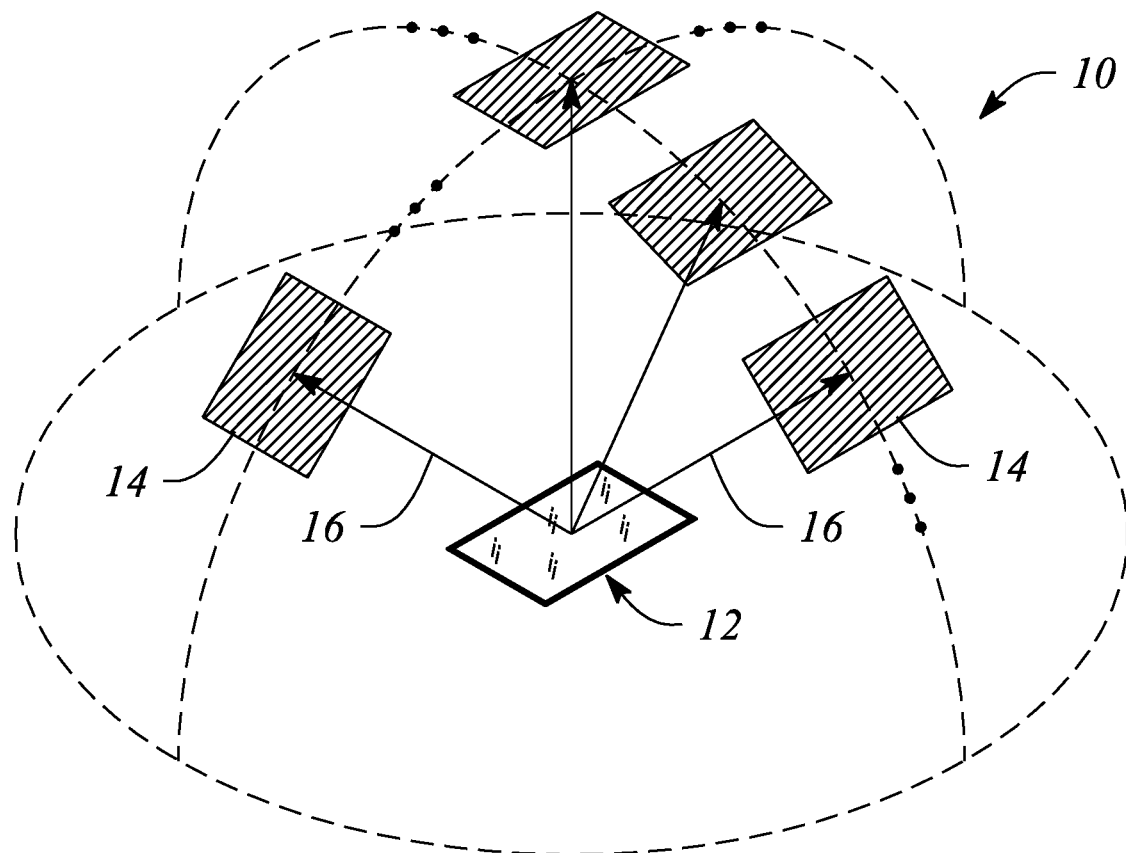
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting employing multiview emitting and broad-angle emitting of light by or from the same backlight or a dual-backlight configuration, with application to electronic displays. In particular, according to various embodiments consistent with the principles herein, a mixed-format backlight is provided having both a multiview zone and a two-dimensional (2D) zone. The multiview zone is configured to provide directional emitted light corresponding to a multiview portion of a mixed-format image displayed by a mixed-format display that employs the mixed-format backlight. The 2D zone is configured to provide broad-angle emitted light corresponding to a 2D portion of the mixed-format image. The multiview zone and the 2D zone may be adjacent to one another in the mixed-format backlight and the multiview portion and the 2D portion of the mixed-format image may be displayed simultaneously by the mixed-format display, according to various embodiments.

Herein a 'two-dimensional (2D) display' or a '2D portion' of a display is defined as a display or portion thereof configured to provide a view of an image that is substantially the same regardless of a direction from which the image is viewed (i.e., within a predefined viewing angle or range of the 2D display). A liquid crystal display (LCD) found in may smart phones and computer monitors are examples of 2D displays. Similarly, a 2D backlight or 2D portion of a backlight is defined as a backlight or backlight portion configured to provide emitted light consistent with displaying an image in a 2D display or 2D display portion. In contrast herein, a 'multiview display' or a 'multiview portion' of a display is defined as an electronic display, display system or portion thereof configured to provide different views of a multiview image in or from different view directions. In particular, the different views may represent different perspective views of a scene or object of the multiview image. In some instances, a multiview display may also be referred to as a three-dimensional (3D) display, e.g., when simultaneously viewing two different views of the multiview image provides a perception of viewing a three dimensional (3D) image. Thus, a 'multiview backlight' or 'multiview portion' of a backlight is a backlight or portion thereof that provides directional emitted light comprising light beams having directions consistent with displaying a multiview image, by definition herein. Uses of multiview displays, multiview backlights, and multiview systems (including portions thereof) applicable to the display of multiview images described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\varphi$ is an angle in a horizontal plane (e.g., parallel to the multiview display screen plane).

Figure 1B:
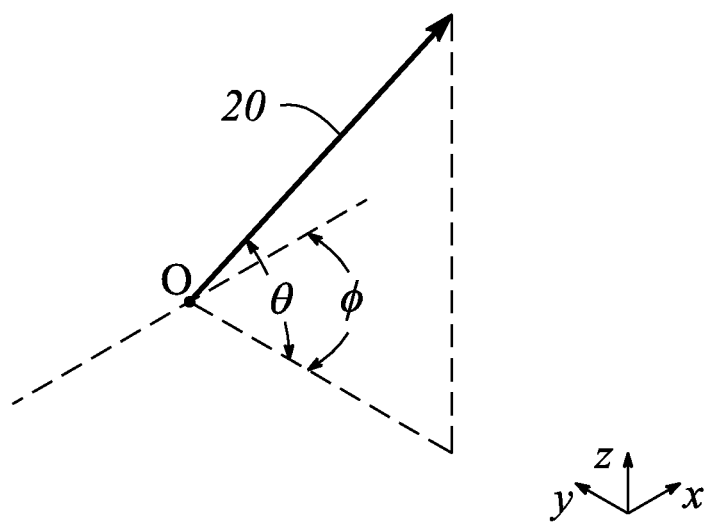
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

By definition herein, a 'multibeam element' is a structure or element of a backlight or a display that produces light that includes a plurality of directional light beams. Directional light beams of the plurality of directional light beams (or 'directional light beam plurality') produced by a multibeam element have different principal angular directions from one another, by definition herein. In particular, by definition, a directional light beam of the directional light beam plurality has a predetermined principal angular direction that is different from another directional light beam of the directional light beam plurality. According to some embodiments, a size of the multibeam element may be comparable to a size of a light valve used in a display that is associated with the multibeam element (e.g., a multiview display). In particular, the multibeam element size may be between about one half and about two times the light valve size, in some embodiments. In some embodiments, a multibeam element may provide polarization-selective scattering.

According to various embodiments, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the directional light beams in combination (i.e., the directional light beam plurality) may represent the light field.

According to various embodiments, the different principal angular directions of the various directional light beams in the directional light beam plurality are determined by a characteristic including, but not limited to, a size (e.g., one or more of length, width, area, and etc.) of the multibeam element along with other characteristics. For example, in a diffractive multibeam element, a 'grating pitch' or a diffractive feature spacing and an orientation of a diffraction grating within diffractive multibeam element may be characteristics that determine, at least in part, the different principal angular directions of the various directional light beams. In some embodiments, the multibeam element may be considered an 'extended point light source', i.e., a plurality of point light sources distributed across an extent of the multibeam element, by definition herein. Further, a directional light beam produced by the multibeam element may have a principal angular direction given by angular components $\{\theta, \varphi\}$, as described below with respect to FIG. 1B.

Herein, an 'active emitter' is defined as an active source of light (e.g., an optical emitter configured to produce and emit light when activated). As such, an active emitter does not receive light from another source of light, by definition. Instead, the active emitter directly generates light when activated. The active emitter may be activated by applying a power source such as a voltage or a current, by definition herein. For example, the active emitter may comprise an optical emitter such as a light emitting diode (LED) that emits light when activated or turned on. Applying a voltage to terminals of the LED, for example, may activate the LED. In particular, herein the light source may be substantially any active source of light or comprise substantially any active optical emitter including, but not limited to, one or more of a light emitting diode (LED), a laser, an organic light emitting diode (OLED), a polymer light emitting diode, a plasma-based optical emitter, and a micro LED (µLED). The light produced by the active emitter may have a color (i.e., may include a particular wavelength of light), or may be a plurality or range of wavelengths (e.g., polychromatic light or white light). Different colors of light provided or produced by an active emitter may include, but are not limited to, primary colors (e.g., red, green, blue), for example. By definition herein, a 'color emitter' is an active emitter that provides light having a color. In some embodiments, the active emitter may comprise a plurality of active emitters. For example, the active emitter may include a set or group of active emitters. In some embodiments, at least one of the active emitters in the set or group of active emitters may generate light having a color, or equivalently a wavelength, that differs from a color or wavelength of light produced by at least one other optical emitter of the plurality.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., >±20°). In other embodiments, the broad-angle emitted light cone angle may be greater than about thirty degrees (e.g., >±30°), or greater than about forty degrees (e.g., >±40°), or greater than fifty degrees (e.g., >±50°). For example, the cone angle of the broad-angle emitted light may be about sixty degrees (e.g., ±60°).

In some embodiments, the broad-angle emitted light cone angle may defined to be about the same as a viewing angle of an LCD computer monitor, an LCD tablet, an LCD television, or a similar digital display device meant for broad-angle viewing (e.g., about ±40-65°). In other embodiments, broad-angle emitted light may also be characterized or described as diffuse light, substantially diffuse light, non-directional light (i.e., lacking any specific or defined directionality), or as light having a single or substantially uniform direction.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further, as used herein, the article 'a' is intended to have its ordinary meaning in the patent arts, namely 'one or more'. For example, 'a multibeam emitter' means one or more multibeam emitters and as such, 'the multibeam emitter' means 'multibeam emitter(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
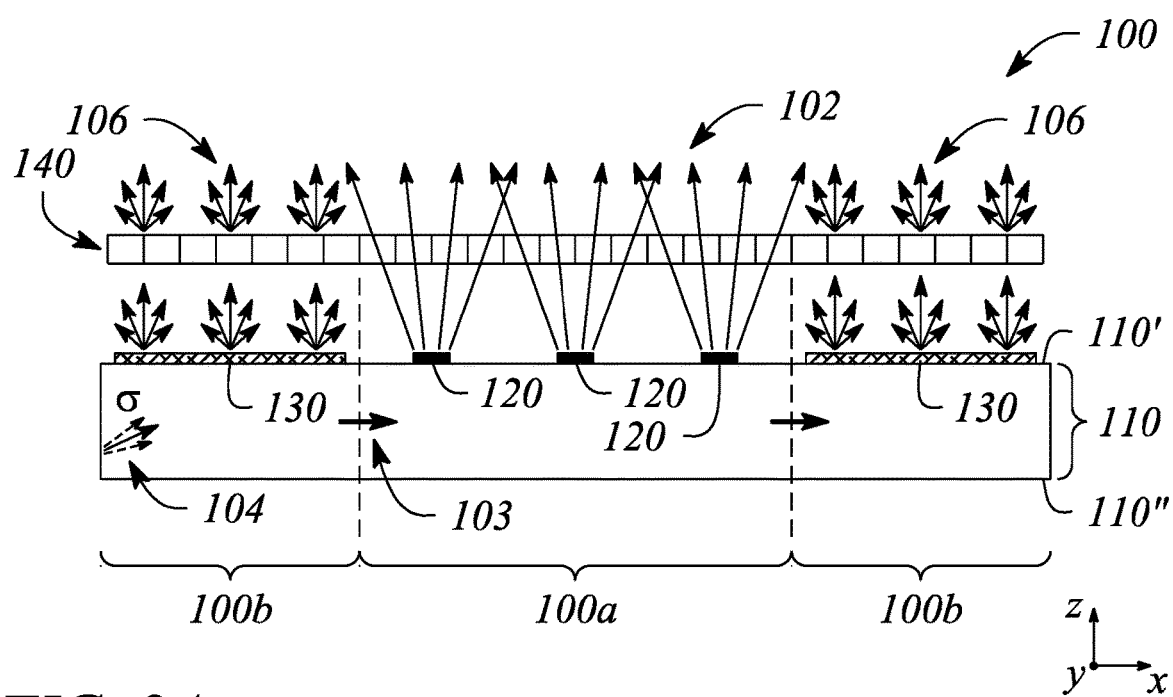
FIG. 2A illustrates a cross-sectional view of a mixed-format backlight in an example, according to an embodiment consistent with the principles herein.
Figure 2B:
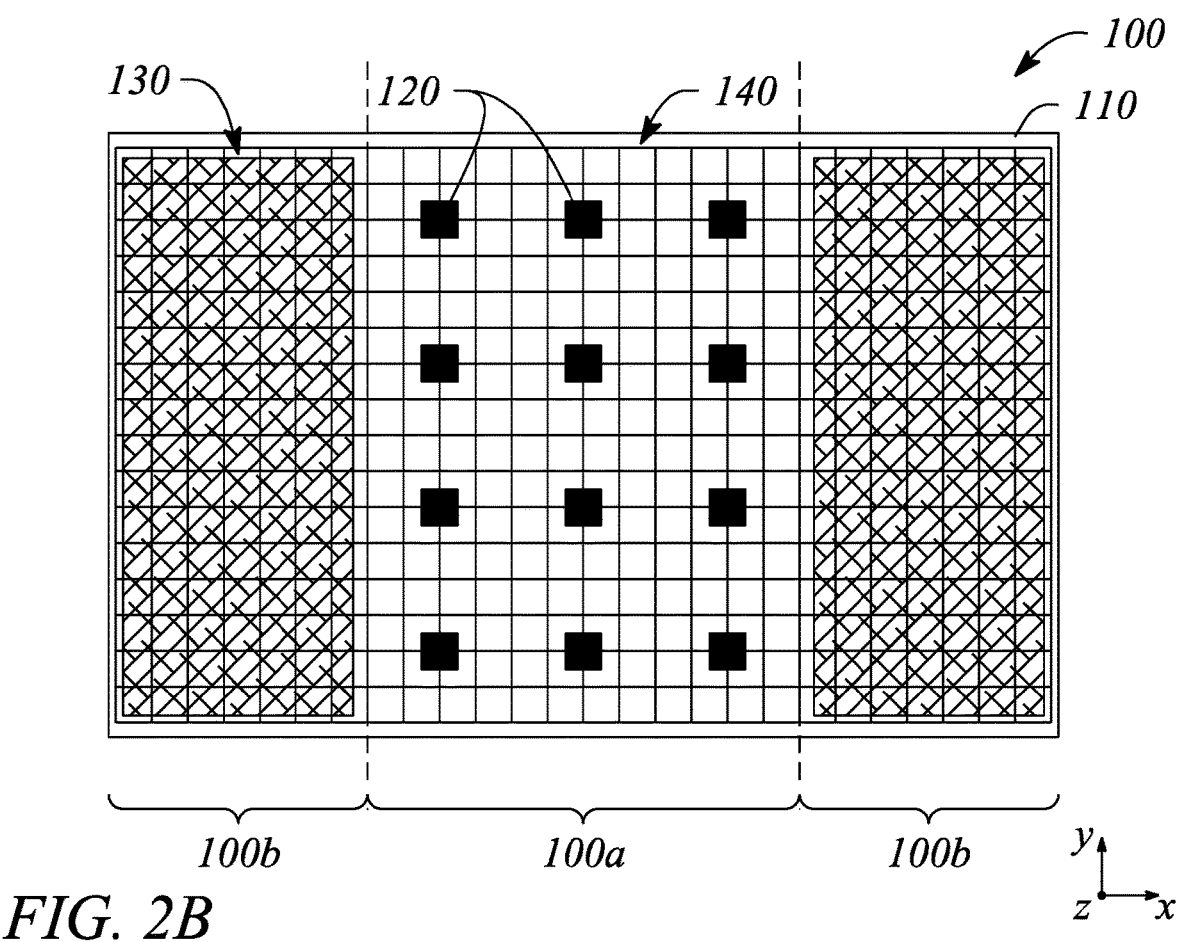
FIG. 2B illustrates a plan view of the mixed-format backlight of FIG. 2A in an example, according to an embodiment consistent with the principles herein.

According to some embodiments of the principles described herein, a mixed-format backlight 100 is provided. FIG. 2A illustrates a cross-sectional view of a mixed-format backlight 100 in an example, according to an embodiment consistent with the principles herein. FIG. 2B illustrates a plan view of the mixed-format backlight 100 of FIG. 2A in an example, according to an embodiment consistent with the principles herein. The mixed-format backlight 100 may be used for backlighting in an electronic display including, but not limited to, a mixed-format display, for example.

The mixed-format backlight 100 illustrated in FIGS. 2A and 2B comprises a multiview zone 100a. The multiview zone 100a is a portion or region of the mixed-format backlight 100 configured to provide directional emitted light. In the embodiment illustrated, the multiview zone 100a comprises the middle portion of a length of the mixed-format backlight 100, by way of example and not limitation. In other embodiments (not illustrated), the multiview zone 100a may comprise another portion or portions of the mixed-format backlight 100.

According to various embodiments (e.g., as illustrated), the multiview zone 100a comprises an array of multibeam emitters 120 spaced apart from one another. In some embodiments, the multibeam emitters 120 of the array are spaced apart from one another along a dimension of the multiview zone 100a. For example, in the embodiment illustrated in FIGS. 2A and 2B, the multibeam emitters 120 are spaced apart from one another across a surface of the mixed-format backlight 100 corresponding to the multiview zone 100a as either a one-dimensional (1D) or a two-dimensional (2D) array. The multiview zone 100a is configured to provide directional emitted light.

In particular, a multibeam emitter 120 of the multibeam emitter array may be configured to provide the directional emitted light as a plurality of directional light beams 102 having different principal angular directions corresponding to respective different view directions of a multiview image. In addition, the multibeam emitters 120 of the array may be separated from one another by a finite space and represent individual, distinct emitters along a surface of the multiview zone 100a. That is, by definition herein, multibeam emitters 120 of the multibeam emitter array may be spaced apart from one another according to a finite (i.e., non-zero) inter-emitter distance (e.g., a finite center-to-center distance). Further, the multibeam emitters 120 of the array generally do not intersect, overlap or otherwise touch one another, according to some embodiments. That is, each multibeam emitters 120 of the array is generally distinct and separated from other ones of the multibeam emitters 120 of the array.

The mixed-format backlight 100 further comprises a two-dimensional (2D) zone 100b. The 2D zone 100b is a portion or a region of the mixed-format backlight 100 configured to provide broad-angle emitted light 106. As such, the 2D zone 100b of the mixed-format backlight 100 comprises a broad-angle emitter 130 configured to provide broad-angle emitted light 106. The broad-angle emitted light 106 is configured for use as an illumination source in a 2D application of a display associated with the mixed-format backlight 100 (e.g., to display a 2D image or portion thereof within a 2D zone of the display).

In some embodiments, the 2D zone 100b is adjacent to the multiview zone 100a. In some embodiments, the 2D zone 100b is the remaining portion of the mixed-format backlight 100 that does not comprise the multiview zone 100a. For example, in the embodiment illustrated in FIGS. 2A and 2B, the 2D zone 100b extends along the first and last third of a length of the mixed-format backlight 100 and thus "sandwiches" the multiview zone 100a between 2D zones 100b. In some embodiments (not illustrated), the 2D zone 100b may comprise a single zone. In other embodiments, such as illustrated in FIGS. 2A and 2B, the 2D zone 100b comprises distinct and non-adjacent portions of the mixed-format backlight 100, or multiple non-adjacent zones. In all embodiments, the multiview zone 100a and the 2D zone 100b are mutually exclusive regions of the mixed-format backlight 100. That is, no region or portion of the mixed-format backlight 100 is located in both the multiview zone 100a and the 2D zone 100b, according to various embodiments.

FIG. 2A further illustrates an array of light valves 140. The light valve array may be part of a mixed-format display that employs the mixed-format backlight 100, for example, and is illustrated in FIG. 2A along with the mixed-format backlight 100 for the purpose of facilitating discussion herein. The array of light valves 140 may be configured to modulate the directional emitted light and more specifically the directional emitted light beams 102 as a multiview image portion of a displayed image, and configured to modulate the broad-angle emitted light 106 as a 2D image portion of the displayed image. Further, the multiview image portion and the 2D image portion are configured to be displayed simultaneously. In various embodiments, different types of light valves may be employed as the light valves 140 of the array of the valves, including but not limited to, one or more of liquid crystal light valves, electrophoretic light valves, and light valves based on electrowetting.

An electronic display configured to utilize the mixed-format backlight 100 may provide a mixed-format image to the viewer, according to various embodiments. The mixed-format image, in turn, may comprise a multiview portion and a 2D portion. Further, the multiview portion and the 2D portion of the displayed mixed-format image may correspond respectively to the multiview zone 100a and the 2D zone 100b of the of the mixed-format backlight 100. The mixed-format backlight 100 thus enables an electronic display to provide a single image having multiview and 2D portions simultaneously.

In some embodiments, a size of the multibeam emitter 120 of the multiview zone 100a is comparable to a size of a light valve 140 of the light valve array. Herein, the 'size' may be defined in any of a variety of manners to include, but not be limited to, a length, a width or an area. For example, the size of a light valve 140 may be a length thereof and the comparable size of the multibeam emitter 120 may also be a length of the multibeam emitter 120. In another example, size may refer to an area such that an area of the multibeam emitter 120 may be comparable to an area of the light valve 140. In yet another example, size of the light valve 140 may refer to a center-to-center spacing (or an equivalent thereof) between adjacent light valves 140.

In some embodiments, the size of the multibeam emitter 120 is comparable to the light valve size such that the multibeam emitter size is between about fifty percent (50%) and about two hundred percent (200%) of the light valve size. In other examples, the multibeam emitter size is greater than about sixty percent (60%) of the light valve size, or about seventy percent (70%) of the light valve size, or greater than about eighty percent (80%) of the light valve size, or greater than about ninety percent (90%) of the light valve size, and the multibeam emitter is less than about one hundred eighty percent (180%) of the light valve size, or less than about one hundred sixty percent (160%) of the light valve size, or less than about one hundred forty percent (140%) of the light valve size, or less than about one hundred twenty percent (120%) of the light valve size. For example, by 'comparable size', the multibeam emitter size may be between about seventy-five percent (75%) and about one hundred fifty (150%) of the light valve size. In another example, the multibeam emitter 120 may be comparable in size to the light valve 140 where the multibeam emitter size is between about one hundred twenty-five percent (125%) and about eighty-five percent (85%) of the light valve size. According to some embodiments, the comparable sizes of the multibeam emitter 120 and the light valve 140 may be chosen to reduce, or in some examples to minimize, dark zones between views of a multiview portion of the electronic display employing the mixed-format backlight 100, while at the same time reducing, or in some examples minimizing, an overlap between views of the multiview portion of the mixed-format display.

Further, a spacing between adjacent multibeam emitters 120 in the multibeam emitter array is commensurate with a spacing between multiview pixels of the multiview portion of the mixed-format display. In some embodiments, an inter-emitter distance (e.g., center-to-center distance) between a pair of adjacent multibeam emitters 120 of the array may be equal to an inter-pixel distance (e.g., a center-to-center distance) between a corresponding adjacent pair of multiview pixels, e.g., represented by light valve sets. For example, a center-to-center distance between the adjacent multibeam emitters 120 may be substantially equal to a center-to-center distance between adjacent light valve sets representing multiview pixels. In other embodiments (not illustrated), the relative center-to-center distances of pairs of multibeam emitters 120 and corresponding light valve sets may differ, e.g., the multibeam emitters 120 may have an inter-emitter spacing (i.e., center-to-center distance) that is one of greater than or less than a spacing (i.e., center-to-center distance) between light valve sets representing multiview pixels.

Further, each multibeam emitter 120 is configured to provide directional light beams 102 to one and only one multiview pixel, according to some embodiments. In particular, for a given one of the multibeam emitters 120, the directional light beams 102 having different principal angular directions corresponding to the respective different view directions of a multiview image are substantially confined to a single corresponding multiview pixel and the view pixels thereof, i.e., a single set of light valves 140 corresponding to the multibeam emitter 120. As such, each multibeam emitter 120 of the mixed-format backlight 100 provides a corresponding set of directional light beams 102 that has a set of the different principal angular directions corresponding to the respective different view directions of a multiview image (i.e., the set of directional light beams 102 contains a light beam having a direction corresponding to each of the different view directions).

In some embodiments, the mixed-format backlight 100 comprises a light guide 110. FIG. 2A illustrates a cross-sectional view of a mixed-format backlight 100 comprising a light guide 110, by way of example and not limitation. The light guide 110 is configured to guide light along a length of the light guide 110 as guided light 104 (i.e., a guided light beam 104). For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the first surface and the second surface) of the light guide 110. The cladding layer may be used to further facilitate total internal reflection, according to some examples.

Further, according to some embodiments, the light guide 110 is configured to guide the guided light 104 according to total internal reflection at a non-zero propagation angle between a first surface 110' (e.g., front or top surface or side) and a second surface 110" (e.g., back or bottom surface or side) of the light guide 110. In particular, the guided light 104 propagates by reflecting or 'bouncing' between the first surface 110' and the second surface 110" of the light guide 110 at the non-zero propagation angle. In some embodiments, a plurality of guided light beams of the guided light 104 comprises different colors of light may be guided by the light guide 110 at respective ones of different color-specific, non-zero propagation angles. Note, the non-zero propagation angle is not illustrated in FIG. 2A for simplicity of illustration. However, a bold arrow depicting a propagation direction 103 illustrates a general propagation direction of the guided light 104 along the light guide length in FIG. 2A.

The multibeam emitter 120 of the multibeam emitter array of the mixed-format backlight 100 comprising a light guide 110 may further comprise a multibeam element. In particular, the multibeam element of the multibeam emitter 120 may be located on a portion of the light guide corresponding to the multiview zone 100a of the mixed-format backlight 100. The multibeam element is configured to scatter out a portion of the guided light 104 as the directional light beam plurality. Directional light beams 102 of the plurality have different principal angular directions corresponding to respective different view directions of a multiview image provided by a multiview portion of the mixed-format display configured to utilize the mixed-format backlight 100.

According to various embodiments, the multibeam element may comprise any of a number of different structures configured to scatter out a portion of the guided light 104. For example, the different structures may include, but are not limited to, diffraction gratings, micro-reflective elements, micro-refractive elements, or various combinations thereof configured to scatter out the guided light 104 as the plurality of directional light beams 102. In some embodiments, the multibeam element comprising a diffraction grating is configured to diffractively scatter out the guided light portion as the plurality of directional light beams having the different principal angular directions. In other embodiments, the multibeam element comprising a micro-reflective element is configured to reflectively scatter out the guided light portion as the plurality of directional light beams, or the multibeam element comprising a micro-refractive element is configured to scatter out the guided light portion as the plurality of directional light beams by or using refraction (i.e., refractively scatter out the guided light portion).

In other embodiments, the multibeam emitter 120 may comprise an active emitter. For example, the multibeam emitter 120 may comprise a micro light emitting diode (microLED or μLED). Herein, μLED is defined as a microscopic light emitting diode (LED), i.e., an LED having microscopic dimensions. In some embodiments, the μLED may comprise a plurality of μLEDs that, when combined, have size that is comparable to the light valve size. According to some embodiments, an active emitter of the multibeam emitter 120 may comprise an organic light emitting diode (OLED). As defined herein, an OLED is an emitter having an emissive electroluminescent film or layer comprising an organic compound configured to emit light in response to an electric current or similar electrical stimulus. In other embodiments, another type of active optical emitter may be used as the active emitter such as, but not limited to, a high intensity LED and a quantum dot LED having a size comparable to the light valve size.

According to some embodiments, the broad-angle emitter 130 of the mixed-format backlight 100 comprising a light guide 110 may comprise a broad-angle scattering feature. The broad-angle scattering feature is located in a portion of the light guide 110 corresponding to the 2D zone 100b of the mixed-format backlight 100, in some embodiments, e.g., as illustrated. The broad-angle scattering feature may comprise substantially any scattering structure configured to scatter out another portion of the guided light 104 as the broad-angle emitted light 106. The broad-angle emitted light 106 may be configured for use as an illumination source in a 2D application of a display associated with the mixed-format backlight 100, e.g., as an illumination source configured to provide a 2D image portion of a displayed image.

Figure 3:
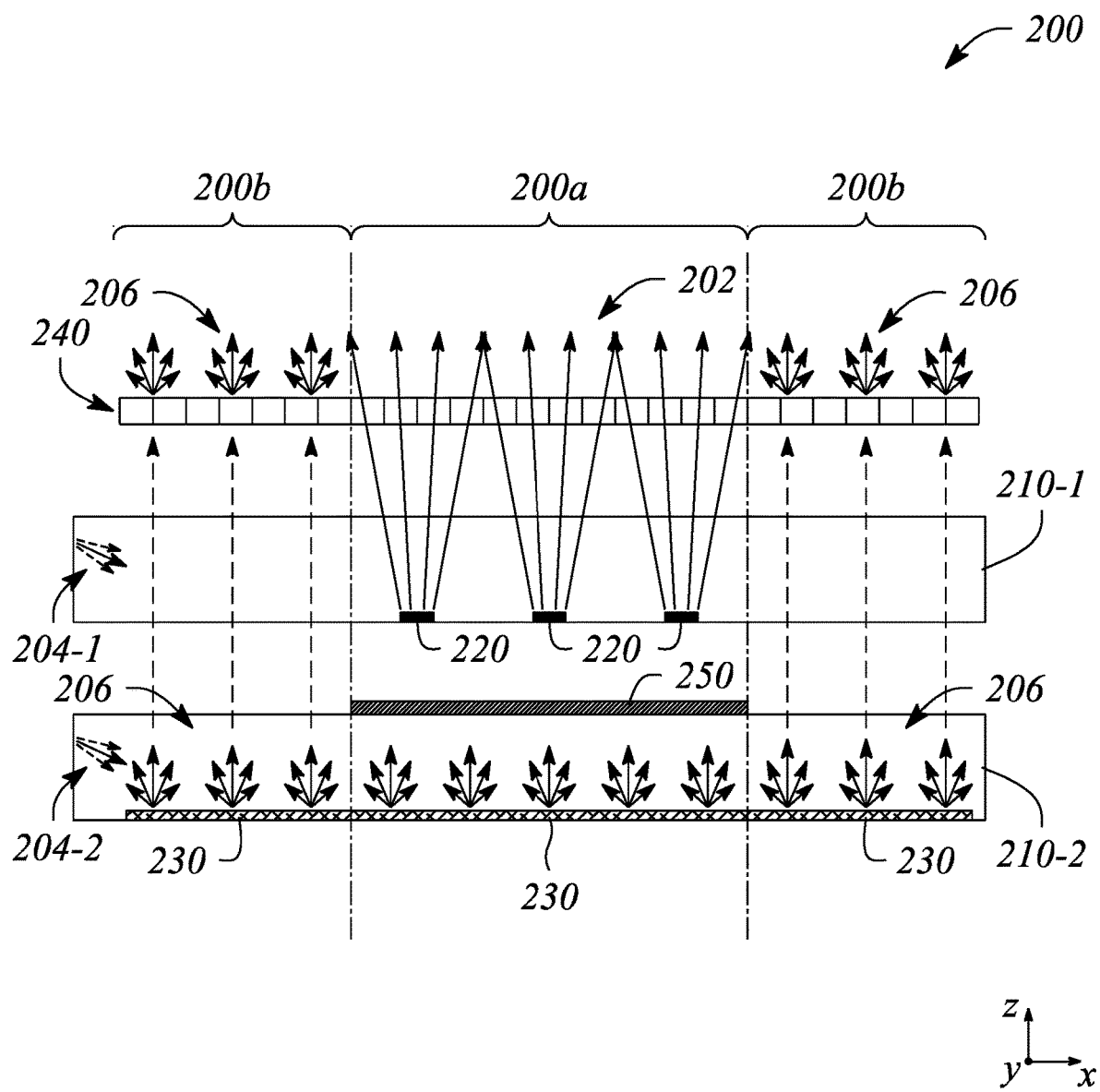
FIG. 3 illustrates a cross-sectional view of a mixed-format backlight having a dual-light guide arrangement in an example, according to an embodiment consistent with the principles described herein.

In other embodiments, the mixed-format backlight may be configured as a dual light guide arrangement. In the dual light guide arrangement, a pair of light guides is employed, each light guide supporting one of the multibeam emitters and the broad-angle emitter to implement the multiview zone and 2D zone, respectively. FIG. 3 illustrates a cross-sectional view of a mixed-format backlight 200 having a dual light guide arrangement in an example, according to an embodiment consistent with the principles described herein.

As illustrated, the mixed-format backlight 200 is divided into the multiview zone 200a and the 2D zone 200b. The multiview zone 200a is configured to provide directional emitted light 202 as a plurality of directional light beams 202 having different principal angular directions corresponding to respective different view directions of a multiview or 3D portion of a displayed image. Likewise, the 2D zone 200b is configured to provide broad-angle emitted light 206 corresponding to the 2D portion of the displayed image. Further, the multiview zone 200a and 2D zone 200b are mutually exclusive, according to various embodiments. In some embodiments, the mixed-format backlight 200 may be substantially similar to the mixed-format backlight 200 with the exception of the dual light guide arrangement that includes two light guides.

In particular, as illustrated in FIG. 3, the mixed-format backlight 200 comprises a first light guide 210-1 and a second light guide 210-2. The first light guide 210-1 is configured to guide light as first guided light 204-1, while the second light guide 210-2 is configured to guide light as second guided light 204-2. According to some embodiments, one or both of the first light guide 210-1 and the second light guide 210-2 may be substantially similar to the light guide 110 previously described above with respect to the mixed-format backlight 100.

In the embodiments illustrated in FIG. 3, the mixed-format backlight 200 further comprises an array of multibeam emitters 220 in a region of the first light guide 210-1 corresponding to the multiview zone 200a of the mixed-format backlight 200. According to various embodiments, multibeam emitters 220 of the array of multibeam emitters 220 are spaced apart from one another across a region of the first light guide 210-1 corresponding to the multiview zone 200a, as illustrated. In some embodiments, the multibeam emitters 220 of the multibeam emitter array may be substantially similar to the multibeam emitters 120 of the above-described mixed-format backlight 100.

In particular, in some embodiments, a multibeam emitter 220 of the multibeam emitter array may comprise a multibeam element. The multibeam element of the multibeam emitter 220 is configured to scatter out a portion of the first guided light 204-1 from the first light guide 210-1 as a plurality of directional light beams 202. Directional light beams 202 of the directional light beam plurality have different principal angular directions corresponding to respective different view directions of the multiview portion of the displayed image. As such, the multibeam element may be substantially similar to the multibeam element of the multibeam emitter 120, described above.

As illustrated in FIG. 3, the mixed-format backlight 200 further comprises a broad-angle emitter 230 configured to provide the broad-angle emitted light 206. In particular, the broad-angle emitter 230 may comprise a broad-angle scattering feature configured to scatter out a portion of the second guided light 204-2 from the second light guide 210-2 as the broad-angle emitted light 206. In some embodiments (not illustrated), the broad-angle scattering feature may be confined to a region of the second light guide 210-2 corresponding to the 2D zone 200b of the mixed-format backlight 200 (or equivalently, to a 2D zone of the second light guide 210-2). That is, no portion of the broad-angle scattering feature may be located outside of the 2D zone 200b of the mixed-format backlight 200. As such, the broad-angle scattering feature may scatter out light as the broad-angle emitted light 206 exclusively in the region of the mixed-format backlight 200 corresponding to the 2D zone.

In other embodiments (e.g., as illustrated in FIG. 3), the broad-angle emitter 230 comprising the broad-angle scattering feature may be distributed across a substantial portion of the second light guide 210-2. As such, the broad-angle scattering feature may scatter light out as broad-angle emitted light 206 from regions of the second light guide 210-2 corresponding to both of the 2D zone 200b and the multiview zone 200a of the mixed-format backlight 200. In these embodiments, a portion of the emitted light 206 in the region corresponding to multiview zone 200a may be blocked to prevent the broad-angle emitted light 206 from interfering with the directional light beams 202.

FIG. 3 also illustrates an array of light valves 240 configured to modulate both the directional light beams 202 provided in the multiview zone 200a and the broad-angle emitted light 206 provided in the 2D zone 200b, i.e., the broad-angle emitted light 206 that passes through the first light guide 210-1, as illustrated by extended dashed arrows in FIG. 3. In some embodiments, the array of light valves 240 may be substantially similar to the array of light valves 140 of the above-described mixed-format backlight 100.

In some embodiments, the mixed-format backlight 200 may further comprise a mask 250 between the first light guide 210-1 and the second light guide 210-2, the mask 250 being configured to block broad-angle emitted light 206 from entering a portion of the first light guide 210-1 corresponding to the multiview zone 200a. In particular, the mask 250 may be disposed between the first and second light guides 210-1, 210-2 in the region corresponding to the multiview zone 200a, as illustrated in FIG. 3. In various embodiments, the mask 250 is opaque or substantially opaque to the broad-angle emitted light 206 and thus is configured to block transmission of the broad-angle emitted light 206 into and through the first light guide 210-1. The mask 250 may comprise substantially any material that is opaque to the broad-angle emitted light 206 from the second light guide 210-2. For example, the mask 250 may comprise a layer of metal. In another example, the mask 250 may be a light absorbing material layer such as, but not limited to, paint or a layer of pigment (e.g., black pigment) that is opaque to the broad-angle emitted light 206. In some embodiments, the mask 250 may be attached to or deposited on a surface of the second light guide 210-2 adjacent to the first light guide 210-1 (e.g., a top surface of the second light guide 210-2). In other embodiments, the mask 250 may be located on a surface of the first light guide 210-1 adjacent to the second light guide 210-2 (e.g., a bottom surface of the first light guide 210-1). In yet other embodiments, the mask 250 may not be attached to and indeed may not even be in contact with either surface of the light guides 210-1, 210-2. In some embodiments (not illustrated), the mask 250 may be used even when the broad-angle emitter is confined to region of the second light guide 210-2 corresponding to the 2D zone 200b.

According to various embodiments, the second light guide 210-2 is located adjacent to the first light guide 210-1 and oriented such that the broad-angle emitted light 206 provided by the scattering from the second light guide 210-2 is directed toward the first light guide 210-1. In particular, as illustrated in FIG. 3, the second light guide 210-2 with the broad-angle emitter 230 is located below the first light guide 210 and separated therefrom by a narrow gap. Moreover, the first and second light guides 210-1, 210-2 are superimposed or stacked such that a top surface of the second light guide 210-2 is substantially parallel to a bottom surface of the first light guide 210-1, as illustrated in FIG. 3. The broad-angle emitted light 206 from the second light guide 210-2 is emitted from the top surface of the second light guide 210-2 and toward the bottom surface of the first light guide 210-1.

Further, the first light guide 210-1 is configured to be transparent to the broad-angle emitted light 206 within the region of the first light guide 210-1 corresponding to the 2D zone 200b of the mixed-format backlight 200. In addition, as illustrated in FIG. 3, portions of the first light guide 210-1 located in the 2D zone 200b of the mixed-format backlight 200 are transparent or at least substantially transparent to the broad-angle emitted light 206 emitted by the second light guide 210-2. As a result of the transparency of the portions of the first light guide 210-1 to the broad-angle emitted light 206, the broad-angle emitted light 206 may propagate through a thickness of the first light guide 210-1 to exit from the top surface of the first light guide 210-1 or equivalently, the top surface of the mixed-format backlight 200, i.e., except where blocked by the mask 250. Dashed arrows in FIG. 3 illustrate propagation of the broad-angle emitted light 206 through the first light guide 210-1 and to the array of light valves 240.

Figure 4:
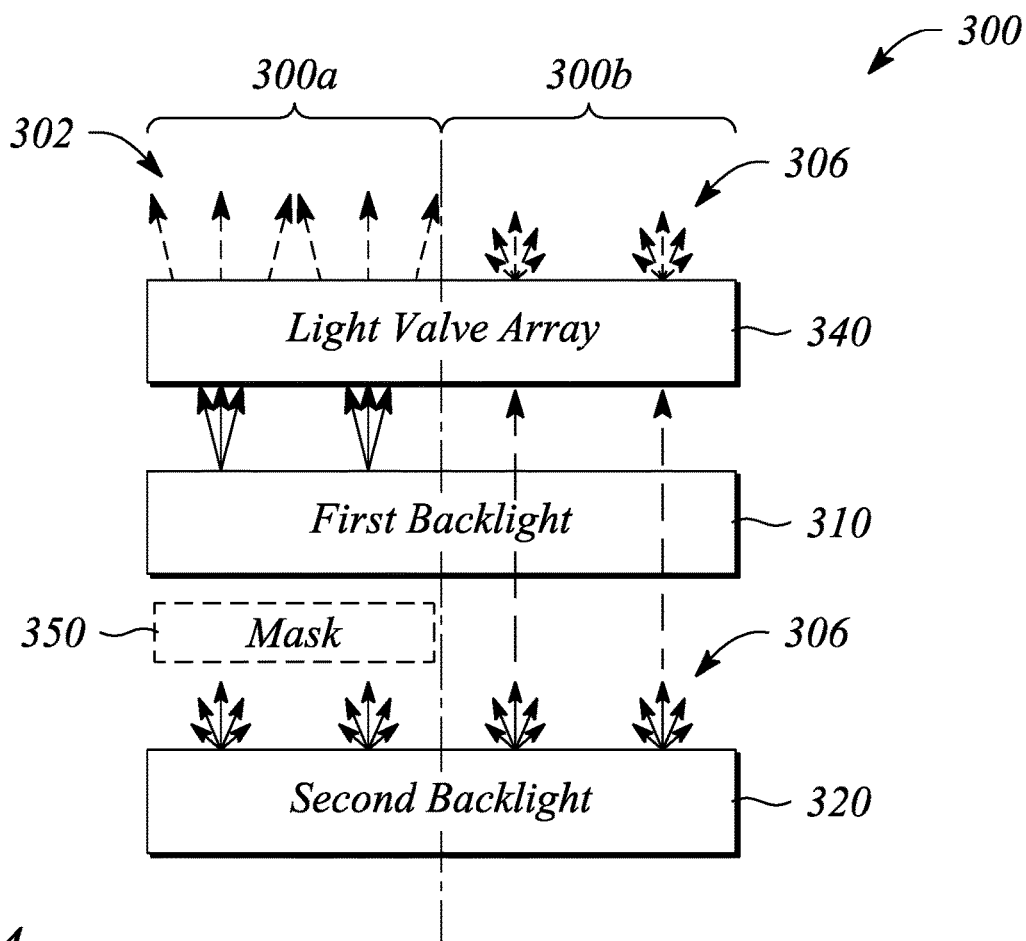
FIG. 4 illustrates a block diagram of a mixed-format display in an example, according to an embodiment of the principles described herein.

In accordance with some embodiments of the principles described herein, a mixed-format display 300 is provided. FIG. 4 illustrates a block diagram of the mixed-format display 300 in an example, according to an embodiment of the principles described herein. The mixed-format display 300 is configured to provide a mixed-format image comprising a multiview portion and a 2D portion that may be displayed simultaneously. Further, the multiview portion of the mixed-format image is configured to be provided by a corresponding multiview zone 300a of the mixed-format display 300, while the 2D portion of the mixed-format image is configured to be provided by a corresponding 2D zone 300b of the mixed-format display 300.

In some embodiments, one or both of the multiview zone 300a and the 2D zone 300b may each comprises a plurality of separate, non-adjacent zones. Further, the multiview zone 300a and the 2D zone 300b are adjacent to one another, according to various embodiments. In some embodiments, the 2D zone 300b comprises more than one non-adjacent zones. In some embodiments, the 2D zone 300b comprises a remaining portion of the mixed-format display 300 that is not occupied by the multiview zone 300a.

Figure 5A:
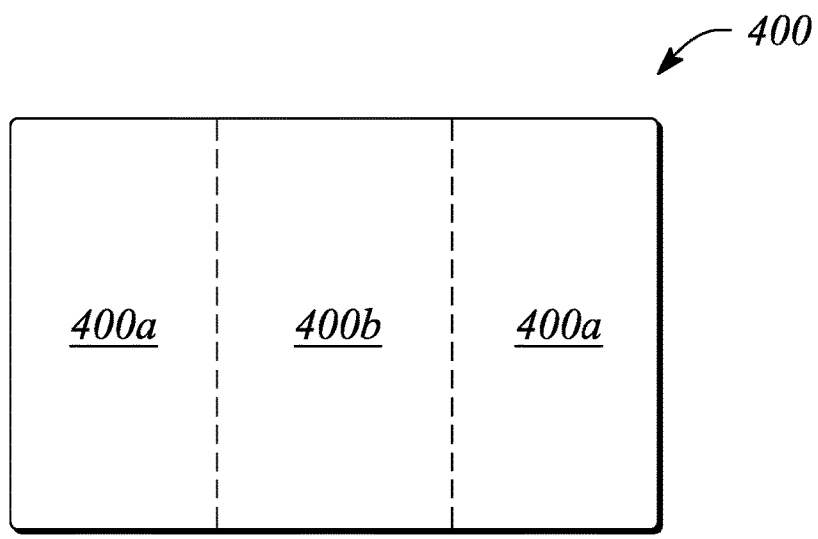
FIG. 5A illustrates a plan view of a mixed-format image that may be provided by a mixed-format display in an example, according to an embodiment of the principles described herein.
Figure 5B:
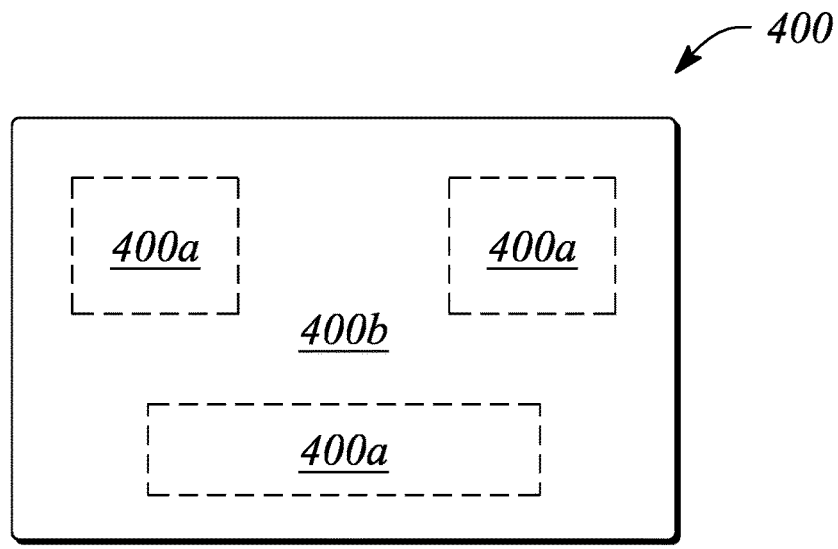
FIG. 5B illustrates a plan view of a mixed-format image that may be provided by a mixed-format display in another example, according to an embodiment of the principles described herein.

FIG. 5A illustrates a plan view of a mixed-format image that may be provided by the mixed-format display 300 in an example, according to an embodiment of the principles described herein. FIG. 5B illustrates a plan view of a mixed-format image that may be provided by the mixed-format display 300 in another example, according to an embodiment of the principles described herein. In particular, FIG. 5A illustrates the mixed-format image 400 comprising two multiview portions 400a corresponding to multiview zones 300a of the mixed-format display 300. Further in FIG. 5A, the illustrated the mixed-format image 400 comprises a 2D portion 400b corresponding to the 2D zone 300b of the mixed-format display 300. In FIG. 5B, the illustrated mixed-format image 400 comprises three multiview portions 400a as well as a 2D portion. Further, the 2D portion 400b (and thus the 2D zone 300b) surrounds the multiview portions 400a (and thus the multiview zones 300a), as illustrated in FIG. 5B.

Referring again to FIG. 4, the mixed-format display 300 comprises a first backlight 310. The first backlight 310 is configured to provide directional emitted light 302. Moreover, the directional emitted light 302 is preferentially and exclusively provided within the multiview zone 300a of the mixed-format display 300, according to various embodiments.

In some embodiments, the first backlight 310 of the mixed-format display 300 comprises a light guide configured to guide light as guided light. The light guide may be substantially similar to the light guide 110 of the mixed-display backlight 100 or the first light guide 210-1 of the mixed-format backlight 200, both previously described. As such, the light guide may be a slab or plate optical waveguide (i.e., a plate light guide) comprising an extended, substantially planar sheet of optically transparent, dielectric material. The substantially planar sheet of dielectric material is configured to guide the guided light using total internal reflection.

In some embodiments, the first backlight 310 of the mixed-format display 300 further comprises an array of multibeam elements spaced apart from one another. In particular, multibeam elements of the multibeam element array are spaced apart from one another across a region of the light guide corresponding to the multiview zone 300a of the mixed-format display 300. Further, no multibeam elements are located beyond the region corresponding to the multiview zone 300a, in some embodiments. According to various embodiments, the array of multibeam elements is configured to provide the directional emitted light 302 as a plurality of directional light beams having different principal angular directions corresponding to respective different view directions the multiview image portion of the displayed image. To that end, a multibeam element of the multibeam element array is configured to scatter out a portion of the guided light from within the light guide of the first backlight 310 as the directional light beams of the directional light beam plurality. As such, the multibeam element may be substantially similar to the multibeam element of the multibeam emitter 120, described above with respect to the mixed-format backlight 100.

In particular, the multibeam element of the array of multibeam elements may comprise one or more of a diffraction grating, a micro-reflective element, and a micro refractive element. In some embodiments, the multibeam element comprising a diffraction grating is configured to diffractively scatter out the guided light portion as the plurality of directional light beams having the different principal angular directions. In other embodiments, the multibeam element comprising a micro-reflective element is configured to reflectively scatter out the guided light portion as the plurality of directional light beams, or the multibeam element comprising a micro-refractive element is configured to scatter out the guided light portion as the plurality of directional light beams by or using refraction (i.e., refractively scatter out the guided light portion).

The mixed-format display 300 illustrated in FIG. 4 further comprises a second backlight 320. The second backlight 320 is configured to provide broad-angle emitted light 306 within the 2D zone 300b of the mixed-format display 300. Moreover, the broad-angle emitted light 306 may be exclusively provided within the 2D zone 300b of the mixed-format display 300, according to various embodiments. In other embodiments (e.g., when a mask is used, as described below), the second backlight 320 may be configured to provide the broad-angle emitted light 306 more-or-less uniformly from substantially all an emitting surface of the second backlight 320.

In some embodiments, the second backlight 320 of the mixed-format display 300 comprises a light guide configured to guide light as guided light. The light guide may be substantially similar to the light guide of the first backlight 310 of the mixed-format display 300, previously described. According to some embodiments, the second backlight 320 further comprises a broad-angle scattering feature configured to scatter out a portion of the guided light from within the light guide of the second backlight 320 as the broad-angle emitted light 306. The broad-angle scattering feature may comprise substantially any scattering feature or scatterer configured to provide the broad-angle emitted light 306. For example, the second backlight 320 may be a backlight from a conventional liquid crystal display (LCD) that employs a light guide and scattering. In another embodiment, the second backlight 320 may comprise another planar light source that does not employ scattering, e.g., an array of light emitting diodes (LEDs), a fluorescent array, or the like.

As illustrated in FIG. 4, the mixed-format display 300 further comprises an array of light valves 340. The array of light valves 340 is configured to modulate the directional emitted light 302 to provide the multiview portion of the mixed-format image within the multiview zone 300a of the mixed-format display 300. The array of light valves 340 is further configured to modulate the broad-angle emitted light 306 to provide the 2D portion of the mixed-format image within the 2D zone 300b of the mixed-format display. According to various embodiments, both the directional emitted light 302 and the broad-angle emitted light 306 may be modulated simultaneously to provide the mixed-format image comprising both the multiview portion and the 2D portion. In some embodiments, the array of light valves may be substantially similar to the array of light valves 140, described above with respect to the mixed-format backlight 100. For example, different types of light valves may be employed as the light valves 340 of the light valve array, including but not limited to, one or more of liquid crystal light valves, electrophoretic light valves, and light valves based on electrowetting.

According to various embodiments, the first backlight 310 of the mixed-format display 300 is located between the second backlight 320 and the array of light valves 340. For example, the first backlight 310 and second backlight 320 may be superimposed or stacked such that a top surface of the second backlight 320 is substantially parallel to a bottom surface of the first backlight 310. Further, the first backlight 310 is configured to be transparent to the broad-angle emitted light 306 provided by the second backlight 320. As a result of both the proximity of the second backlight 320 to the first backlight 310 and the transparency of the first backlight 310, the broad-angle emitted light 306 provided by the second backlight 320 may pass through a thickness of the first backlight 310 to be emitted toward the light valves 340, where it is modulated to provide the 2D portion of the mixed-format displayed image.

In some embodiments (e.g., as illustrated), the mixed-format display 300 further comprises a mask 350 disposed between the first backlight 310 and the second backlight 320. The mask 350 is disposed in the region of the mixed-format display 300 corresponding to the multiview zone 300a. The mask 350 is configured to block the broad-angle emitted light 306 from passing through a region of the first backlight 310 corresponding to the multiview zone 300a of the mixed-format display 300. The mask 350 may comprise any material that is opaque to the broad-angle emitted light 306 from the second light guide 320. In some embodiments, the mask 350 may be substantially similar to the mask 250 of the above-described mixed-format backlight 200.

In some embodiments, a size of the multibeam element of the first backlight 310 is between fifty percent (50%) and two hundred percent (200%) of a size of a light valve 340 of the light valve array. Further, a spacing between adjacent multibeam elements of the multibeam element array may be commensurate with a spacing between adjacent multiview pixels of the mixed-format display 300. For example, an inter-emitter distance (e.g., center-to-center distance) between a pair of adjacent multibeam emitters may be equal to an inter-pixel distance (e.g., a center-to-center distance) between a corresponding adjacent pair of multiview pixels, e.g., represented by sets of light valves 340 of the light valve array.

Figure 6:
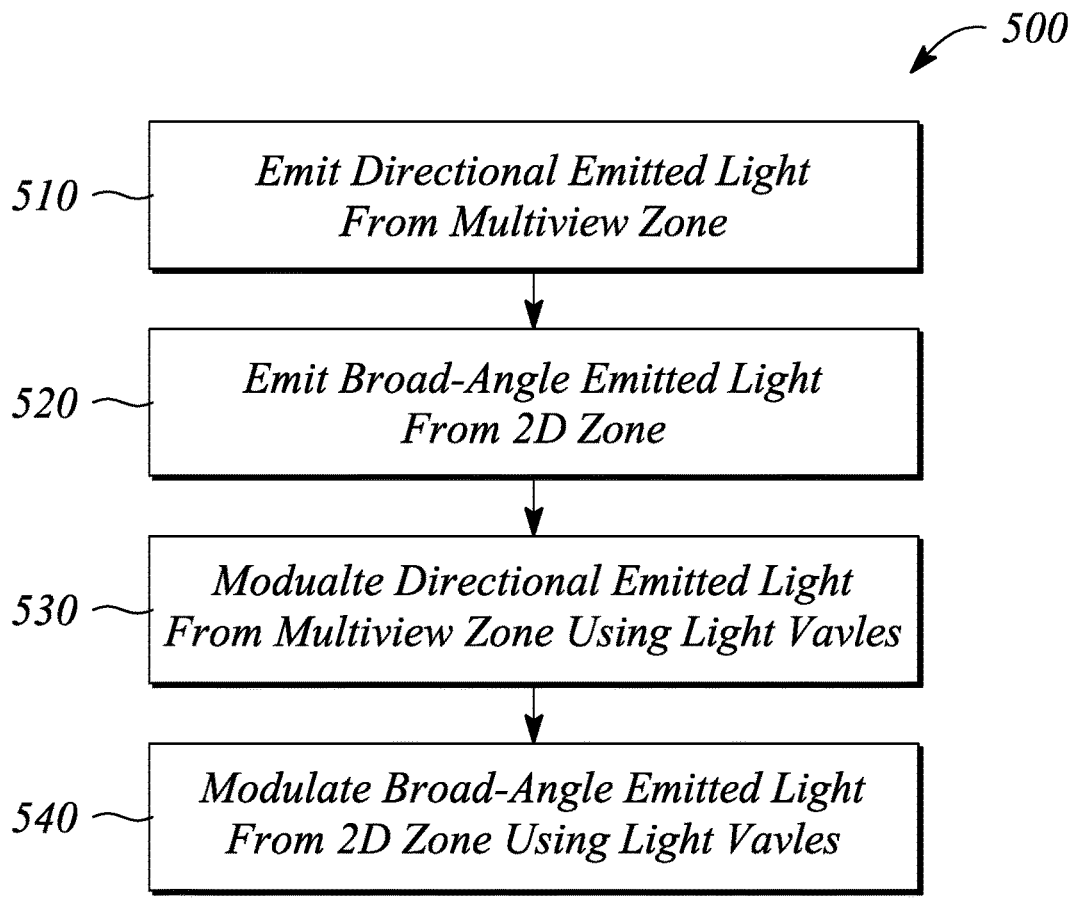
FIG. 6 illustrates a flow chart of a method of mixed-format backlight operation in an example, according to an embodiment consistent with the principles described herein.

According to some embodiments of the principles described herein, a method 500 of mixed-format backlight operation is provided. FIG. 6 illustrates a flow chart of the method 500 of mixed-format backlight operation, according to an embodiment consistent with the principles described herein. As illustrated, the method 500 of mixed-format backlight operation comprises emitting 510 directional emitted light from a multiview zone of the mixed-format backlight using an array of multibeam emitters. The multiview zone of the mixed-format backlight is a region of the mixed-format backlight configured to provide directional light. Each multibeam emitter of the multibeam emitter array provides a plurality of directional light beams of the directional emitted light having different principal angular directions corresponding to respective different view directions a multiview image. The multiview image is the multiview portion of a mixed-format image comprising both the multiview portion and a two-dimensional (2D) portion. According to various embodiments, the directional emitted light may be modulated by light valves of a mixed-format display that employs the mixed-format backlight to display the multiview portion of a mixed-format image.

The method 500 further comprises emitting 520 broad-angle emitted light from a two-dimensional (2D) zone of the mixed-format backlight using a broad-angle emitter. The 2D zone of the mixed-format backlight is a region of the mixed-format backlight that provides broad-angle light. According to various embodiments, the broad-angle emitted light may be modulated as the 2D portion of the mixed-format displayed image using light valves of the mixed-format display that employs the mixed-format backlight. In some embodiments, the 2D zone is adjacent to the multiview zone. In some embodiments, the 2D zone comprises the remainder of the mixed-format backlight from the multiview zone. The 2D zone and the multiview zone are mutually exclusive. Accordingly, no portion of the mixed-format backlight belongs to both the 2D zone and the multiview zone, by definition herein.

According to various embodiments, a size of the multibeam emitter of the multibeam emitter array is comparable to a size of a light valve of a mixed-format display that employs the mixed-format backlight. Herein, the 'size' may be defined in any of a variety of manners to include, but not be limited to, a length, a width or an area. For example, the size of a light valve may be a length thereof and the comparable size of the multibeam emitter may also be a length of the multibeam emitter. In another example, size may refer to an area such that an area of the multibeam emitter may be comparable to an area of the light valve. In some embodiments, therefore, the size of the multibeam emitter is comparable to the light valve size such that the multibeam emitter size is between about fifty percent (50%) and about two hundred percent (200%) of the light valve size, for example.

In some embodiments, the multiview zone of the mixed-format backlight and the multibeam emitters may be substantially similar respectively to the multiview zone 100a, 200a and multibeam emitters 120, 220 of the above described mixed-format backlight 100. Similarly, the 2D zone and broad-angle emitter of the mixed-format backlight may be substantially similar respectively to the 2D zone 100*b*, 200*b* and broad-angle emitter 130, 230 also of the mixed-format backlight 100, 200. Further, the light valves used to modulate the directional emitted light and broad-angle emitted light may be substantially similar to the light valves 140, 240, also described above.

In particular, in some embodiments, emitting 510 directional emitted light may comprise guiding light in a light guide as guided light. The light guide may be substantially similar to the light guide 110 of the mixed-format backlight 100 previously described. Emitting 510 may further comprise scattering out a portion of the guided light using a multibeam emitter of the multibeam emitter array. According to various embodiments, the multibeam emitter may comprise one or more of a diffraction grating, a micro-refractive element, and a micro-reflective element configured to scatter out the guided light portion as the plurality of directional light beams. In some embodiments, the light guide may be substantially similar to either the light guide 110 or the first light guide 210-1, described above with respect to the mixed-format backlight 100, 200.

Further, in some embodiments, emitting 520 the broad-angle emitted light comprises guiding light in a light guide as guided light. In some embodiments, the light guide may be substantially similar to either the light guide 110 or the second light guide 210-2 of the mixed-format backlight 100, 200, previously described. Emitting 520 the broad-angle emitted light may further comprise scattering out a portion of the guided light using a broad-angle scattering feature. The broad-angle scattering feature is configured to emit the broad-angle light exclusively from the 2D zone of the mixed-format backlight, according to various embodiments. In some embodiments, the broad-angle scattering feature may be substantially similar to the broad-angle scattering feature of the broad-angle emitter 130, 230 of the above-described mixed-format backlight 100, 200.

In some embodiments (as illustrated by way of example and not limitation in FIG. 6), method 500 of mixed-format backlight operation further comprises modulating 530 the directional emitted light using an array of the light valves to provide the multiview portion of the mixed-format image. The method 500 of mixed-format backlight operation may further comprise modulating 540 the broad-angle emitted light using the light valve array to provide the 2D image portion of the mixed-format image, also as illustrated by way of example and not limitation in FIG. 6. Both the directional emitted light and the broad-angle emitted light may be modulated 530, 540 simultaneously to provide the mixed-format image comprising both the multiview portion and the 2D portion, according to various embodiments.

Thus, there have been described examples and embodiments of a mixed-format backlight, a mixed-format display and a method of mixed-format backlight operation including a multiview zone and a 2D zone. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A mixed-format backlight comprising:
    a multiview zone having an array of multibeam emitters spaced apart from one another and configured to provide directional emitted light, a multibeam emitter of the multibeam emitter array being configured to provide the directional emitted light as a plurality of directional light beams having different principal angular directions corresponding to respective different view directions of a multiview image;
    a light guide configured to guide light as guided light; and
    a two-dimensional (2D) zone having a broad-angle scattering feature configured to scatter out a portion of the guided light from the light guide as broad-angle emitted light, the multiview zone and the 2D zone being mutually exclusive regions of the mixed-format backlight,
    wherein a size of the multibeam emitter of the multibeam emitter array is comparable to a size of a light valve of a mixed-format display configured to employ the mixed-format backlight.

2. The mixed-format backlight of claim 1, wherein a spacing between adjacent multibeam emitters of the multibeam emitter array is commensurate with a spacing between multiview pixels of a multiview portion of the mixed-format display.

3. The mixed-format backlight of claim 1, wherein the multibeam emitter of the multibeam emitter array includes a multibeam element configured to scatter out another portion of the guided light as the directional light beam plurality.

4. The mixed-format backlight of claim 3, wherein the multibeam element comprises one or more of a diffraction grating, a micro-refractive element, and a micro-reflective element configured to scatter out the other portion of the guided light as the plurality of directional light beams.

5. The mixed-format backlight of claim 1, wherein the light guide is a first light guide, wherein the guided light is first guided light, and the mixed-format backlight further comprises:
    a second light guide configured to guide light as second guided light, the multibeam emitter of the multibeam emitter array comprising a multibeam element configured to scatter out a portion of the second guided light from the second light guide as the plurality of directional light beams,
    wherein the second light guide is configured to be transparent to the broad-angle emitted light within a region of the second light guide corresponding to the 2D zone of the mixed-format backlight.

6. The mixed-format backlight of claim 5, wherein the multibeam emitter array is located in a region of the second light guide corresponding to the multiview zone of the mixed-format backlight and the broad-angle scattering feature is confined to a region of the first light guide corresponding to the 2D zone of the mixed-format backlight.

7. The mixed-format backlight of claim 5, further comprising a mask between the first light guide and the second light guide in the region of the mixed-format backlight corresponding to the multiview zone, the mask being configured to block transmission of the broad-angle emitted light into and through the second light guide within the multiview zone.

8. A mixed-format display comprising the mixed-format backlight of claim 1, the mixed-format display further comprising an array of light valves configured to modulate the broad-angle emitted light as a two-dimensional (2D) image portion of a displayed image and configured to modulate the directional emitted light as a multiview image portion of the displayed image, the 2D image portion being provided within a region of the mixed-format display corresponding to the 2D zone of the mixed-format backlight and the multiview image portion being provided within a region of the mixed-format display corresponding to the multiview zone of the mixed-format backlight, wherein the multiview image portion has views with view directions corresponding to respective different view directions.

9. The mixed-format display of claim 8, wherein the 2D image portion and the multiview image portion are configured to be displayed simultaneously by the mixed-format display.

10. A mixed-format display comprising:
a first backlight configured to provide directional emitted light within a multiview zone of the mixed-format display;
a second backlight adjacent to the first backlight, the second backlight including a light guide configured to guide light as guided light, the second back light including a broad-angle scattering feature configured to scatter out a portion of the guided light from the light guide as broad-angle emitted light within a two-dimensional (2D) zone of the mixed-format display, the multiview zone and the 2D zone being mutually exclusive regions of the mixed-format display; and
an array of light valves configured to modulate the directional emitted light to provide a multiview image portion of a displayed image within the multiview zone of the mixed-format display, and configured to modulate the broad-angle emitted light to provide a 2D image portion of the displayed image within the 2D zone of the mixed-format display,
wherein the first backlight is between the second backlight and the array of light valves.

11. The mixed-format display of claim 10, further comprising a mask disposed between the first backlight and the second backlight, the mask being configured to block a portion of the broad-angle emitted light from passing through a region of the first backlight corresponding to the multiview zone of the mixed-format display.

12. The mixed-format display of claim 10, wherein the light guide is a first light guide, the guided light is first guided light, and the first backlight comprises:
a second light guide configured to guide light as second guided light; and
an array of multibeam elements spaced apart from one another and configured to provide the directional emitted light as a plurality of directional light beams having different principal angular directions corresponding to respective different view directions of the multiview image portion of the displayed image, a multibeam element of the multibeam element array being configured to scatter out a portion of the second guided light as directional light beams of the plurality of directional light beams.

13. The mixed-format display of claim 12, wherein the multibeam element comprises one or more of a diffraction grating, a micro-reflective element, and a micro-refractive element.

14. The mixed-format display of claim 12, wherein a size of the multibeam element is between fifty percent (50%) and two hundred percent (200%) of a size of a light valve of the light valve array, and wherein a spacing between adjacent multibeam elements of the multibeam element array is commensurate with a spacing between adjacent multiview pixels of the mixed-format display.

15. The mixed-format display of claim 10, wherein the broad-angle scattering feature is confined to a portion of the light guide of the second backlight corresponding to the 2D zone of the mixed-format display.

16. The mixed-format display of claim 10, wherein the first backlight comprises a first region of the light guide having an array of multibeam elements configured to scatter out a portion of the guided light as the directional emitted light,
wherein a multibeam element of the multibeam element array is configured to scatter out the guided light portion as a plurality of directional light beams having different principal angular directions corresponding to respective different view directions of the multiview image portion of the displayed image.

17. A method of mixed-format backlight operation, the method comprising:
emitting directional emitted light from a multiview zone of the mixed-format backlight using an array of multibeam emitters, each multibeam emitter of the multibeam emitter array providing a plurality of directional light beams of the directional emitted light having different principal angular directions corresponding to respective different view directions a multiview image;
guiding light in a light guide as guided light; and
scattering out a portion of the guided light from the light guide as broad-angle emitted light using a broad-angle scattering feature disposed in from a two-dimensional (2D) zone of the mixed-format backlight, the multiview zone and the 2D zone being mutually exclusive regions of the mixed-format backlight,
wherein a size of the multibeam emitter of the multibeam emitter array is comparable to a size of a light valve of a mixed-format display that employs the mixed-format backlight.

18. The method of mixed-format backlight operation of claim 17, wherein the light guide is a first light guide, the guided light is first guided light, and emitting the directional emitted light comprises:
guiding light in a second light guide as second guided light; and
scattering out a portion of the second guided light using a multibeam emitter of the multibeam emitter array, one or more of a diffraction grating, a micro-refractive element, and a micro-reflective element of the multibeam emitter being configured to scatter out the guided light portion as the plurality of directional light beams.

19. The method of mixed-format backlight operation of claim 17, further comprising:
modulating the directional emitted light using an array of light valves to provide a multiview image portion of a displayed image, the multiview image portion having view directions corresponding to respective different view directions of the multiview image; and
modulating the broad-angle emitted light using the light valve array to provide a 2D image portion of the displayed image.

* * * * *